June 13, 1944. J. SENN 2,351,458
DEVICE FOR MANUFACTURING CO2-BUTTER FROM CREAM AND MILK
Filed July 23, 1940
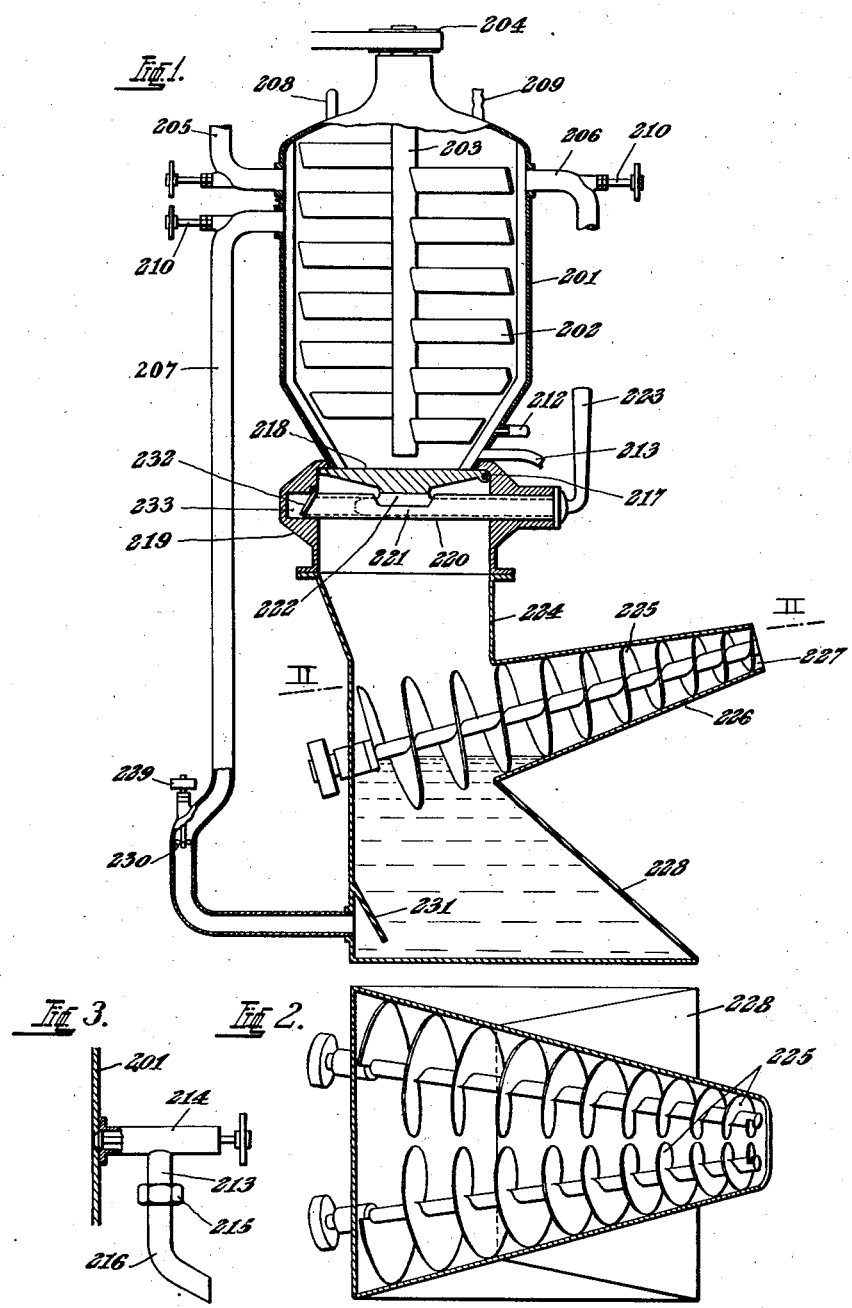
James Senn
INVENTOR
BY
ATTORNEY.

Patented June 13, 1944

2,351,458

UNITED STATES PATENT OFFICE 2,351,458

DEVICE FOR MANUFACTURING $CO_2$-BUTTER FROM CREAM AND MILK

James Senn, Berne, Switzerland

Application July 23, 1940, Serial No. 346,896
In Switzerland May 27, 1939

6 Claims. (Cl. 31—33)

The present invention relates to a machine for manufacturing $CO_2$-butter from cream and milk. One object of the present invention is to provide a butter manufacturing machine in which the starting material is treated in a pressure vessel by a stirring device at a regulable speed, whereupon the butter is washed with water and finally dehydrated to regulate its moisture content while air and light are shut-off.

This arrangement facilitates the manufacture of carbon dioxide butter and it avoids the well known disadvantages of the usual butter making methods. It further permits reduction of the duration of the whole process, inclusive of washing, salting, dehydrating, forming and packing to 2 to 9 minutes.

Carbon dioxide may be used as a compressed gas or in liquid form or even in mixture with atmospheric air. Air alone is not adapted for such purpose on account of its low content of carbon dioxide and its high oxygen content which is injurious to the butyric fat and also because the churning would take too much time. Preferably the method is carried through in a continuous process such, that all operations including the forming and packing are done according to season, time of lactation, feeding, breed and so forth, within a space of 2 to 9 minutes. The admission of carbon dioxide under a rising pressure brings about within the shortest time, that is within 5 to 60 seconds, not only a nicely grained butter of a mat brightness, but also a sufficient cooling to insure a yield above the average.

It is possible to change the lacteal fat of the cream and the milk in a few moments into butter grains by means of carbon dioxide under pressure and fractional cooling in a pressure vessel with a regulable stirring device and to dehydrate the butter sufficiently without over-churning.

With a carbon dioxide pressure of several atmospheres, the cream in the churn will change under the effect of the regulable stirring device suddenly into a mass of foam wherein the fat globules conglomerate into smaller or larger lumps of fat. As soon as this has occurred the foam disappears or collapses, because it is unable to carry the fat globules which have agglomerated to fat clots.

In the new apparatus, the butter immediately after its separation from the buttermilk is at once hardened artificially and is washed with constantly renewed cold water and then dehydrated by means of a condenser. By regulating the temperature of the washing water and the speed of the stirring device the water content of the butter may be varied within wide limits.

The annexed drawing illustratively exemplifies the present invention.

Fig. 1 is a vertical section of one embodiment of a machine according to the invention, Fig. 2 is a section on line II—II of Fig. 1, and Fig. 3 shows a slightly modified detail on a larger scale.

Referring now to the drawing and principally to Figs. 1 and 2, 201 indicates a pressure vessel enclosing a stirring device 202 the shaft 203 of which is driven by a pulley 204. The cream admission conduit 205, the washing water conduit 206 and the return conduit 207, all open into the upper part of the vessel 201. The upper portion of the pressure vessel 201 possesses further a safety valve 208 and an outlet neck 209 for the carbon dioxide. The conduits 205, 206, and 207 are controlled by valves 210 having conical discs 211 as shown, for instance, in Fig. 3, said discs in the closed condition of the valve being flush with the inner wall of the pressure vessel 201 so that no substance may adhere to the discs. A carbon dioxide nozzle 212 delivers the gas into the lower conical space of the pressure vessel near the washing water discharge and buttermilk draining conduit 213. As shown in Fig. 3, this conduit may be provided with a valve 214 of the kind described and may be attached by means of a gland 215 to a discharge pipe 216 capable of swinging through an arc of 180°. According to the position of this pipe it may serve for draining water or draining buttermilk from the pressure vessel.

To the lower end of the vessel 201 is hinged at 217 a bottom plate 218 which may be opened or shut by means of a locking device. This device is enclosed in a housing 219 attached to the pressure vessel and including a pipe 220 arranged rotatably and slidably in a longitudinal direction and rigidly connected to a bolt 221. The bolt 221 carries a cam 222 extended through an opening in the pipe 220 and bearing, in the shown position, tightly against the bottom 218, thus pressing the same firmly against the pressure vessel. A handle 223 provided on the outside of the housing 219 serves for operating the locking device.

Directly below the housing 219 and connected to it light and air tightly is located the liquid container 224. In this container are journaled two conveying worms 225 arranged alongside each other and driven from the outside of the liquid container by a gear of a known structure (not shown). The axes of the worms 225 are mounted with their lower ends in a side wall of the liquid container 224. Both worms are conical and are only slightly spaced from each other. Their tapering ends extend into a conical neck 226 of the liquid container the small end of which is at a higher level than its mouth opening into the liquid container. The conveying worms are supported by this obliquely upwards rising neck 226. The lower portion 228 of the liquid container is formed like the frustrum of a pyramid. Near the bottom of this lower portion 228 starts the above mentioned return conduit 207 into which is inserted a screw pump 230 driven from the pulley 229. This pump returns the liquid sucked-off from the portion 228 into the pressure vessel 201. A baffle plate 231 is inserted before the inlet of the return conduit 207 in the portion 228a of the liquid container to prevent any butter lumps from being carried away.

The working of the described apparatus is as follows: When the churning has been completed in the pressure vessel 201, first the buttermilk is drained through the pipe 213. Then the washing water is admitted through pipe 206, this water being drained off again through pipe 213. This washing process will be repeated about twice. Then handle 223 is turned about 90° whereby cam 222 of the locking device is brought out of engagement with the bottom 218, whereupon bolt 221 with pipe 220 is pulled so far to the right, that the bottom 218 of the pressure vessel hangs freely down into the housing 219. A freely swinging flap 232 in the housing 219 prevents the admission of liquid or of butter into the recess 233 provided for the bolt in the housing 219.

By way of the opening in the bottom the butter collected in the pressure vessel drops with the last washing water into the liquid container 224 where the liquid is always kept at a level slightly above the lower portion of the neck 226. The butter floating upon the liquid is now seized by the conveying worms, and drawn into the neck 226 where it will be dehydrated by the kneading action of the worms, whereupon the kneaded butter when leaving said neck is directly admitted to the packing machine. The water freed in the neck by the kneading runs back into the liquid container 224 owing to the inclined arrangement of the neck 226.

The liquid in the liquid container is preferably water and with advantage water which can have according to the season a temperature of 2 to 8° C. Also the washing water used for washing the butter turned out in the pressure vessel 201 possesses preferably the same temperature. But the liquid container could also in the case where salted butter is wanted be supplied with brine of which a portion after the washing of the butter in the pressure vessel would be conveyed by the pump 230 and the conduit 207 into the pressure vessel and then together with the butter by opening the bottom 218 be returned again into the liquid container.

The driving of the two pulleys 204 and 229 is effected by a driving shaft not shown.

What I claim is:

1. A machine for manufacturing butter in the presence of carbon dioxide comprising a churn including a stirring device, a condenser vessel adapted to contain water, said vessel being located beneath said churn and forming with the latter a common housing, means in said condenser vessel to separate the butter from the water and to condense and discharge the butter with a desired water content, closure means between said churn and condenser vessel through which the granular butter produced in the churn may be dropped into said condenser vessel, and means to operate said closure means from the outside of said housing.

2. A machine for manufacturing butter comprising a churn including a stirring device, a vessel adapted to contain water, said vessel being disposed beneath said churn and communicating therewith through a discharge opening in the bottom of the latter, and a conveyor worm arrangement in said vessel to seize the butter floating in the water and to condense and discharge said butter with the desired water content.

3. A machine, as claimed in claim 2, in which said vessel includes a conical upwardly inclined neck portion, said conveyor worm arrangement being disposed in said neck portion and extending with its lower end into the main body of said vessel.

4. A machine, as claimed in claim 2, in which said conveyor worm arrangement includes two conical conveyor worms disposed side by side and rotatable in opposite directions.

5. A machine for manufacturing butter in the presence of carbon dioxide comprising a churn including a stirring device, a vessel adapted to contain water, said vessel being located beneath said churn and forming with the latter a common housing, means permitting the dropping of the granular butter produced in said churn into said condenser vessel, and a conveyor worm arrangement in said vessel to seize the butter floating in the water and to condense and discharge said butter with the desired water content.

6. A machine for manufacturing butter comprising a churn including a stirring device, means to admit washing water to said churn, a condenser vessel located beneath said churn and communicating therewith through a discharge opening in the bottom of the latter, means arranged in said condenser vessel to separate the butter from the washing water and to condense and discharge the butter with a desired water content, a return conduit between said condenser vessel and said churn and means to return water from said vessel through said conduit to the churn.

JAMES SENN.